United States Patent [19]
Thompson

[11] Patent Number: 6,139,881
[45] Date of Patent: Oct. 31, 2000

[54] CHROMIUM-CARBOXYLIC ACID FEED SUPPLEMENT

[75] Inventor: Leif H. Thompson, Philo, Ill.

[73] Assignee: Thompson Animal Systems, Inc., Philo, Ill.

[21] Appl. No.: 09/484,678

[22] Filed: Jan. 18, 2000

Related U.S. Application Data

[60] Provisional application No. 60/119,350, Feb. 9, 1999.

[51] Int. Cl.[7] .............................. A23K 1/00; A23K 1/175
[52] U.S. Cl. .................. 426/2; 426/69; 426/74; 426/271; 426/807
[58] Field of Search .................. 426/2, 74, 69, 426/271, 807

[56] References Cited

U.S. PATENT DOCUMENTS 3,642,489  2/1972  Bartley et al. .................. 99/2
5,637,312  6/1997  Tock et al. .................. 424/438

OTHER PUBLICATIONS

White et al., 54th Minnesota Nutrition Conference and National Renderers Technical Symposium pp. 251–261, Sep. 1993.

Yang et al., Can. J. Anim. Sci., vol. 76, pp. 221–230, 1996.

Lindemann et al., J. Anim. Sci., vol. 73, pp. 457–465, 1995.

*Primary Examiner*—Chhaya D. Sayala
*Attorney, Agent, or Firm*—Philip L. Bateman

[57] ABSTRACT

The combination of a chromium ion and a carboxylic acid ion selected from the group consisting of a formate ion, a malate ion, and a fumarate ion is an effective feed supplement for ruminant animals and improves their weight gain, feed efficiency, body composition, and milk production.

10 Claims, No Drawings

CHROMIUM-CARBOXYLIC ACID FEED SUPPLEMENT

CROSS-REFERENCE TO RELATED APPLICATION

This application claims the benefit of U.S. Provisional Application Serial No. 60/119,350, filed Feb. 9, 1999, now pending.

FIELD OF THE INVENTION

This invention relates to feed supplements for ruminant animals.

BACKGROUND OF THE INVENTION

Ruminants are hoofed, even-toed mammals of the suborder Ruminantia that have a stomach divided into four compartments and that chew a cud consisting of regurgitated, partially digested food. Well known ruminants include cattle, sheep, goats, deer, and giraffes. Of this group, the most important to man are cattle, sheep, and goats because they are raised as livestock for home use and profit around the world.

The diet fed to ruminant livestock is important because it has a major effect on the animal's growth rate, body composition, and, in the case of mature females, milk production. Within the past several decades, the supplementation of plant feed with various micronutrients has become more common. A large number of feed supplements for ruminants have been disclosed.

Chromium is a metallic element of atomic number 24 that has been used a feed supplement. In a 1996 article entitled "Effects of Chromium Supplementation on Early Lactation Performance of Holstein Cows" published in the *Canadian Journal of Animal Science*, W. Z. Yang et al. report that supplementing the diet of Holstein cows with an amino acid-chelated chromium compound increased milk yield. The authors discuss several possible reasons for the increase. First, the chromium may increase glucogenic capacity. Second, the chromium may alter glucose metabolism by altering insulin sensitivity. And third, the chromium may play a role in reducing gluconeogenesis from amino acids.

The use of other chromium compounds as feed supplements is disclosed in Wolfram et al., U.S. Pat. No. 4,326,523, issued Apr. 27, 1982 (subcutaneous implants); Howard, U.S. Pat. No. 4,335,116, issued Jun. 15, 1982 (organometallic complexes); and Ashmead et al., U.S. Pat. No. 5,614,553, issued Mar. 25, 1997 (amino acid chelates).

Tock et al., U.S. Pat. No. 5,637,312, issued Jun. 10, 1997, disclose the use of sodium formate NaOOCH as a feed supplement for ruminants. Tock et al. state the formate salts stimulate certain beneficial microorganisms in the rumen. These microorganisms are able to break the beta linkages between glucose molecules in cellulose roughage, a major portion of the diet of ruminants. The free glucose molecules are then converted by enzymes to volatile fatty acids which, in turn, are further digested. In short, the addition of sodium formate improves ruminant weight gain and milk production by enhancing the digestibility of cellulose roughage.

SUMMARY OF THE INVENTION

The general objects of this invention is to provide an improved feed supplement for ruminants and an improved method for enhancing the growth rate, feed efficiency, body composition, and/or milk production of ruminant animals.

I have invented an improved feed supplement for ruminants. The supplement comprises a chromium ion and a carboxylic acid ion selected from the group consisting of a formate ion, a malate ion, and a fumarate ion. I have also invented an improved method for enhancing the growth rate, feed efficiency, body composition, and/or milk production of ruminant animals. The method comprises supplementing the diet with a chromium ion and a carboxylic acid ion selected from the group consisting of a formate ion, a malate ion, and a fumarate ion.

The combination of the chromium ion and carboxylic acid ion produces an unexpected and synergistic improvement in the growth rate, feed efficiency, body composition, and/or milk production of ruminant animals.

DETAILED DESCRIPTION OF THE INVENTION

The feed supplement of this invention comprises a chromium ion and a carboxylic acid ion selected from the group consisting of a formate ion, a malate ion, and a fumarate ion. The chromium ion is produced when elemental chromium lose three electrons, as typically occurs when ionic chromium compounds are dissolved in water. The chromium ion is often represented as $Cr^{+3}$ or as Cr (III). Carboxylic acid ions are produced when a carboxylic acid, a compound containing the carboxyl group COOH, loses the hydrogen proton. Carboxylic acid ions are named after the acid from which they are derived. For example, the formate ion COO— is derived from formic acid (methanoic acid) HCOOH, the malate ion $COOHCH_2CH(OH)COO$— is derived from malic acid (hydroxysuccinic acid) $COOHCH_2CH(OH)COOH$, and the fumarate ion HOOC-CH:CHCOO is derived from fumaric acid (trans-butenedioic acid) HOOCCH:CHCOOH.

The chromium ion is effective in an amount of about 20 to 1,000 parts per billion by weight (ppb) of the total diet. The chromium ion is most effective in an amount of about 100 to 500 ppb. The carboxylic acid ion is effective in an amount of about 500 to 10,000 parts per million by weight (ppm) of the total diet. The preferred level of carboxylic acid ion depends on the molecular weight of the ion. The formate ion has a molecular weight of about 44, the malate ion has a molecular weight of about 133, and the fumarate ion has a molecular weight of about 115. Accordingly, if a particular number of carboxylic acid ions is desired, malate would have to be added at about three times (133/44) the weight of formate.

The chromium ion and the carboxylic acid ion are present in single compounds known as chromium salts. These compounds are chromium formate, also known as chromium triformate, $Cr(OOCH)_3$, chromium malate, also known as chromium trimalate, $Cr(OOC(OH)CHCH_2COOH)_3$, and chromium fumarate, also known as chromium trifumarate, $Cr(OOCCH:CHCOOH)_3$. Although these chromium salts are easily prepared using well known technology, they are not widely available commercially. Furthermore, these compounds contribute chromium ion and carboxylic acid ion in amounts that are within an order of magnitude. In contrast, chromium is present at a much lower level than the carboxylic acid ion in the supplement of this invention. It can be appreciated that, if only chromium formate were added to the diet, either chromium would be present at too high a level or the formate ion would be present at too low a level.

For the above reasons, it is preferred to use separate compounds containing the chromium ion and the carboxylic acid ions. Suitable compounds containing the chromium ion include, but are not limited to, chromium picolinate, chromium nicotinate, and amino-acid-chelated chromium. Suitable compounds containing the carboxylic acid ions include, but are not limited to, sodium formate, sodium malate, and sodium fumarate, the corresponding calcium salts, and the corresponding potassium salts. The preferred compounds containing the carboxylic acid ions are sodium formate, sodium malate, and sodium fumarate due to their ready availability. The most preferred compounds are chromium picolinate and sodium formate.

The chromium and carboxylic acid compounds are preferably combined with a filler before use to simplify handling and mixing. A preferred filler is a starch gel. For example, combining one part of the chromium and carboxylic acid compounds with about three parts starch gel and then extruding the mixture produces a pelletized material that is very easy to handle and mix with feed. If desired, a flavoring agent can be added to improve palatability and insure consumption.

The use of the chromium and carboxylic acid compounds of this invention as a feed supplement for ruminant animals produces significant improvement in the growth rate, feed efficiency, body composition, and/or milk production of ruminant animals. The improvements are especially significant for female animals raised under marginal, i.e., less than optimal in terms of quality and quantity of diet, conditions. Furthermore, the use of these compounds is relatively inexpensive and produces no known side effects in the animals when administered at the levels discussed.

The following examples are illustrative only. All percentages are based on weight.

EXAMPLE 1

This example describes an experiment that illustrates the beneficial effect of adding the feed supplement of this invention to the diet of ruminant animals.

Twenty-four male lambs and twenty-four female lambs aged between about four and five months (near puberty) were obtained. The lambs were weighed, given a single dose of vitamins A, D, and E by injection, and were dewormed with IVOMEC systemic dewormer, a commercial product of the Merck Company of St. Louis, Mo.

The lambs were then placed into sixteen pens inside a barn. Three male lambs were placed in each of eight pens and three female lambs were placed in each of eight pens. The lambs were allocated to the pens according to initial weight. More particularly, the eight heaviest male lambs were randomly assigned to separate pens. The next eight heaviest male lambs were then randomly assigned to the eight pens. And finally, the eight lightest male lambs were assigned to the pens. The same allocation was done with the female lambs. This allocation ensured that each pen contained one relatively heavy lamb, one middle-weight lamb, and one relatively light lamb. Each pen had approximately 21 square feet (approximately 7 square feet per lamb).

The lambs were then fed diets of four different feeds. The feeds are identified as Feed Nos. 1, 2, 3, and 4, and are described in detail below. Each of the four feeds was given to two pens of male lambs (a total of six male lambs) and two pens of female lambs (a total of six female lambs). Feed was offered ad libitum (the food trough was never allowed to become empty). Fresh water was provided free choice.

Each of the four feeds was a moderately high roughage feed consisting of 50% soybean hulls, 30% ground corn, 17% soybean meal (49% protein), 2% molasses, 0.75% ammonium chloride, and 0.25% (5 lbs per ton) of a corn meal component.

Feed No. 1 was the basal diet. Its corn meal component consisted solely of corn meal.

In Feed No. 2, the corn meal component consisted of 80% (4 lbs per ton) corn meal and 20% (1 lb per ton) CHROMAX supplement, a commercial product of the Prince Company of Quincy, Ill. containing 0.04% chromium in the form of chromium picolinate in an inert carrier. The resulting feed contained 200 ppb chromium ion.

In Feed No. 3, the corn meal component consisted of 40% (2 lbs per ton) corn meal and 60% (3 lbs per ton) sodium formate. The resulting feed contained 1,000 ppm formate ion.

In Feed No. 4, the corn meal component consisted of 20% (1 lb per ton) corn meal, 20% (1 lb per ton) CHROMAX supplement, and 60% (3 lbs per ton) sodium formate. The resulting feed contained 200 ppb chromium ion and 1,000 ppm formate ion.

The quantity of feed consumed per pen was recorded daily. Lamb body weight was taken at weekly intervals. The experiment lasted two weeks for one replication of twelve male lambs and twelve female lambs. The experiment last four weeks for the second replication of twelve male lambs and twelve female lambs. The efficiency of the feed was calculated by dividing the feed consumed by the weight gain. A high efficiency is reflected in a small number. The results of the experiment are presented in Table 1.

TABLE 1

Effect of Chromium and Formate on Weight Gain and Feed Efficiency of Male and Female Lambs

| Calculated Parameter | Basal Diet | Chromium Only | Formate Only | Chromium and Formate |
|---|---|---|---|---|
| Average Daily Wt. Gain (lb.) | 0.41 | 0.38 | 0.46 | 0.44 |
| Feed/Gain | 3.99 | 4.47 | 3.64 | 3.35 |

The results show that the addition of chromium without formate had a slightly negative effect on both average daily weight gain and on feed efficiency. The addition of formate without chromium had a beneficial effect on both average daily weight gain and feed efficiency. The addition of both chromium and formate produced an unexpected and synergistic improvement in feed efficiency of 16% [(3.99−3.35)/3.99]. It can be appreciated that reducing the amount of feed by 16% and still achieving the same weight gain represents a large potential savings in feed costs, even after taking into account the additional cost of the chromium and formate supplement.

Table 2 presents the data from the same experiment, except for the female lambs only. The data for the male lambs can be calculated by the difference.

TABLE 2

Effect of Chromium and Formate on Weight Gain and Feed Efficiency of Female Lambs

| Calculated Parameter | Basal Diet | Chromium Only | Formate Only | Chromium and Formate |
|---|---|---|---|---|
| Average Daily Wt. Gain (lb.) | 0.38 | 0.39 | 0.43 | 0.48 |
| Feed/Gain | 5.03 | 5.47 | 4.71 | 4.16 |

The results show that the female lambs had a much greater response in average daily weight gain to the chromium and formate supplement than the male lambs. The combined male and female lambs had an increase in average daily weight gain of 0.03 lbs (0.44–0.41), the female lambs had an increase in average daily weight gain of 0.10 lbs. (0.48–0.38), and the male lambs had a decrease in average daily weight gain of 0.04 lbs (0.40–0.44). The increase in average daily weight gain for the female lambs represents a 26% improvement [(0.48–0.38)/0.38]. This gender-based response was also unexpected. While not wishing to be bound by theory, a possible explanation is that the interaction of female hormones played a more significant role. The addition of both chromium and formate produced an improvement in feed efficiency of 17% [(5.03–4.16)/5.03] which is comparable to the 16% improvement for both male and female lambs.

In summary, Example 1 shows that the addition of chromium and formate produced a significant increase in daily weight gain for female lambs only and also produced a significant increase in feed efficiency for both male and female lambs.

EXAMPLE 2

This example describes an experiment that illustrates the effect of different carboxylic acid ions on the feed supplement of this invention.

Eighteen female lambs aged between about four and five months (near puberty) were obtained, weighed, and placed, three apiece, into six pens inside a barn. The lambs were allocated to the pens according to initial weight as described in Example 1. Each pen had approximately 21 square feet (approximately 7 square feet per lamb). The lambs were given a single dose of vitamins A, D, and E by injection, and were dewormed with IVOMEC systemic dewormer.

The lambs were then fed diets of two different feeds. The feeds are identified as Feed Nos. 1 and 2, and are described in detail below. Each of the feeds was given to three pens of female lambs (a total of nine female lambs). Feed was offered ad libitum and fresh water was provided free choice.

Each of the two feeds was a moderately high roughage feed consisting of 50% soybean hulls, 30% ground corn, 17% soybean meal (49% protein), 2% molasses, 0.75% ammonium chloride, and 0.25% (5 lbs per ton) of a corn meal component.

Feed No. 1 was identical to Feed No. 4 in Example 1. The corn meal component consisted of 20% (1 lb per ton) corn meal, 20% (1 lb per ton) CHROMAX supplement, and 60% (3 lbs per ton) sodium formate. The resulting feed contained 200 ppb chromium ion and 1,000 ppm formate ion.

In Feed No. 2, the corn meal component consisted of 20% (1 lb per ton) corn meal, 20% (1 lb per ton) CHROMAX supplement, 40% (2 lbs per ton) sodium formate, 10% (one-half lb per ton) sodium malate, and 10% (one-half lb per ton) sodium fumarate. The resulting feed contained 200 ppb chromium ion, 667 ppm formate ion, 167 ppm malate ion, and 167 ppm fumarate ion.

The quantity of feed consumed per pen was recorded daily. Lamb body weight was taken at weekly intervals. The experiment lasted two weeks. The efficiency of the feed was calculated by dividing the feed consumed by the weight gain. A high efficiency is reflected in a small number. The results of the experiment are presented in Table 3.

TABLE 3

Effect of Carboxylic Acid Ion Identity on Weight Gain and Feed Efficiency

| Calculated Parameter | Chromium and Formate | Chromium, Formate, Malate, and Fumarate |
| --- | --- | --- |
| Average Daily Wt. Gain (lb.) | 0.44 | 0.46 |
| Feed/Gain | 3.68 | 3.69 |

The results show that the choice of carboxylic acid ion has little effect on the average daily weight gain and on the feed efficiency. Accordingly, the selection of carboxylic acid ion is a matter of choice depending primarily on cost and availability.

EXAMPLE 3

This example describes an experiment that illustrates the effect of the feed supplement of this invention on the milk production of dairy cows raised under marginal conditions.

Seventeen cows of mixed genetic background (Jersey crosses and Holsteins) were grazed as a group on unimproved native pasture at an elevation of approximately 500 meters in Costa Rica. The cows were milked twice each day and the weight of the milk was measured. At each milking, all seventeen cows were fed a supplement containing corn, sorghum, rice bran, soybean meal, molasses, and a coccidiostat. The supplement was fed individually to the cows at a level of about 1 kg of supplement per 8 lbs of milk produced according to the initial milk production level, i.e., the amount of milk produced on the day before the experiment began. The protein content of the supplement was 14%, crude fiber was 12%, ether extract was 2%, and the digestible energy was approximately 3100 KCal/kg.

The cows were divided into the two groups, a control group and a treated group, based on initial milk production level. In other words, the two cows with the greatest initial milk production were randomly assigned to the control and treated groups, the two cows with the next greatest initial milk productions were then randomly assigned to the control and treated groups, and so on. The eight cows in the control group received no chromium and no formate in their supplement. The remaining nine cows received chromium and formate in their supplement. The cows receiving chromium and formate received it in the form of 4 g CHROMAX and 10 g sodium formate each day.

The experiment continued for ten days. During this period, drought conditions were experienced and the pasture conditions deteriorated significantly. The results of the experiment are presented in Table 4.

TABLE 4

Effect of Supplement on Milk Production of Dairy Cows Under Marginal Conditions

| Calculated Parameter | No Chromium or Formate | Chromium and Formate |
| --- | --- | --- |
| Average Daily Milk Yield for Days 1–3 | 37.03 | 31.77 |
| Average Daily Milk Yield for Days 8–10 | 30.88 | 32.41 |

The results show that the milk yield of the cows not receiving chromium or formate decreased significantly during the ten-day experiment, presumably because of the deteriorating pasture conditions. However, the milk yields of the cows receiving chromium and formate actually increased slightly.

EXAMPLE 4

This example describes an experiment that illustrates the effect of the feed supplement of this invention on milk production patterns of dairy cows raised under good conditions.

Eighteen high quality purebred Holstein cows were grazed as a group on improved pastures of lush grass primarily of African Star variety at an elevation of approximately 1100 meters in Costa Rica. All the cows were within 125 days of freshening (i.e., they had each given birth within 125 days) and were in excellent body condition. The cows were milked twice each day and the weight of the milk was measured. At each milking, all eighteen cows were fed a supplement containing corn, sorghum, rice bran, soybean meal, molasses, and a coccidiostat. The supplement was fed individually to the cows at a level of about 1 kg of supplement per 8 lbs of milk produced according to the initial milk production level, i.e., the amount of milk produced on the day before the experiment began. The protein content of the supplement was 14%, crude fiber was 12%, ether extract was 2%, and the digestible energy was approximately 3100 KCal/kg.

The cows were divided into the two groups based on initial milk production level as described in Example 3. Nine of the cows received no chromium and no formate in their supplement. The remaining nine cows received chromium and formate in their supplement. The cows receiving chromium and formate received it in the form of 4 g CHROMAX and 10 g sodium formate each day.

The experiment continued for ten days. During this period, conditions remained relatively unchanged. The results of the experiment are presented in Table 4.

TABLE 5

Effect of Supplement on Milk Production of Dairy Cows Under Good Conditions

| Calculated Parameter | No Chromium or Formate | Chromium and Formate |
| --- | --- | --- |
| Average Daily Milk Yield for Days 1–3 | 55.06 | 58.83 |
| Average Daily Milk Yield for Days 8–10 | 55.12 | 59.20 |

The results show that the milk yield for the cows receiving chromium and formate improved slightly more than the control group (59.20–58.83=0.37 versus 55.12–55.06= 0.06). The supplement did not appear to cause any problems.

I claim:

1. A feed supplement for ruminant animals, the supplement comprising a chromium ion and a carboxylic acid ion selected from the group consisting of a formate ion, a malate ion, and a fumarate ion.

2. The feed supplement of claim 1 wherein the supplement comprises a chromium ion and a formate ion.

3. The feed supplement of claim 2 wherein the supplement comprises a chromium ion derived from chromium picolinate and a formate ion derived from sodium formate.

4. A method for improving the growth rate, feed efficiency, body composition, and/or milk production of ruminant animals, the method comprising supplementing the diet with a chromium ion and a carboxylic acid ion selected from the group consisting of a formate ion, a malate ion, and a fumarate ion.

5. The method of claim 4 wherein the diet is supplemented with a chromium ion derived from chromium picolinate and a formate ion derived from sodium formate.

6. The method of claim 5 wherein chromium is added to the diet in an amount of about 20 to 1,000 ppb and carboxylic acid ion is added to the diet in an amount of about 500 to 10,000 ppm.

7. A method for improving the growth rate, feed efficiency, body composition, and/or milk production of female ruminant animals, the method comprising supplementing the diet with a chromium ion and a carboxylic acid ion selected from the group consisting of a formate ion, a malate ion, and a fumarate ion.

8. The method of claim 7 wherein the diet is supplemented with a chromium ion derived from chromium picolinate and a formate ion derived from sodium formate.

9. The method of claim 8 wherein chromium is added to the diet in an amount of about 20 to 1,000 ppb and carboxylic acid ion is added to the diet in an amount of about 500 to 10,000 ppm.

10. The method of claim 9 wherein the female ruminant animals are selected from the group consisting of sheep and cattle.

* * * * *